Jan. 14, 1936. J. BLACKBURN 2,027,415
UNITARY WIRE CONNECTER
Filed May 20, 1935

INVENTOR
JASPER BLACKBURN
By Adam E. Fisher
ATTORNEY

Patented Jan. 14, 1936

2,027,415

UNITED STATES PATENT OFFICE 2,027,415

UNITARY WIRE CONNECTER

Jasper Blackburn, Webster Groves, Mo.

Application May 20, 1935, Serial No. 22,400

7 Claims. (Cl. 173—263)

This invention relates to improvements in unitary wire connecters for joining two or more electrical conductors or wires, such as a service line to a main line or the like. Unitary wire connecters of the split or bifurcated bolt type, comprising a head with a pair of parallel and segmentally threaded legs extended therefrom in spaced relation for providing a wire receiving space or slot therein between and having a tapped nut operatively anchored to the bolt and threadable upon the legs thereof, for locking the wires in place, are now quite common. So far as known the means generally employed for anchoring the nut to the bolt consists of an element of some sort longitudinally extended at the extremity of one of the legs of the bolt and disposed either directly thru the orifice of the nut, or connected to or adapted to impinge a washer or bearing element which is in turn rotatably connected to the nut, so that the nut may be withdrawn off the end of the bolt and supported on this element and swung aside for admitting wires into the wire slot of the bolt. Such extensions from one leg of the bolt, while efficient for anchoring the elements together, are more or less in the way and liable to be broken off, and they also interfere with the process of taping the resulting joints.

It is the prime purpose of the present invention therefore to provide a unitary connecter of the bifurcated or slotted bolt type, including a nut operatively yoked or connected to one of the legs of the bolt and threadable thereupon, the nut being withdrawable at the end of the leg to which it is secured for admitting wires into the slot of the bolt, and wherein the means employed for thus operatively anchoring the nut to the bolt, includes no element extending or protruding beyond the extremities of the legs thereof. Another object is to provide in a connecter of the kind referred to and including a bifurcated and exteriorly threaded bolt or keeper, the legs thereof being spaced apart to form a wire receiving slot and including a nut threadable upon the legs of the bolt, means for operatively anchoring the nut to the bolt, the same comprising a lug rotatably mounted within the orifice of the nut and formed to freely slide within the slot of the bolt, there being a groove or channel formed medially upon one face of the lug parallel with the axis of the orifice of the nut, and another groove or channel formed transversely immediately back of the predetermined inner end of the first named groove, a strand or loop extended across the said inner end of the first named channel for forming an eye or hook engaging aperture, and a hook mounted upon the inner face of the extremity of one of the legs of the bolt in such form and position relative to the said eye of the lug, as to automatically engage and interlock with that eye on the withdrawal movement of the nut, and upon which hook the nut and lug assembly may then be swung aside for admitting wires into the slot of the bolt, in which operation the said medial channel of the lug serves to pass the said hook and the transverse channel serves to receive the extremity of that leg of the bolt carrying the hook, as the nut is swung to one side.

With the foregoing and such other objects in view as may be developed in the following specification, attention is directed to the accompanying drawing in connection with the specification, the same illustrating certain preferred embodiments and structural features of the invention, and wherein.

Figure 1:
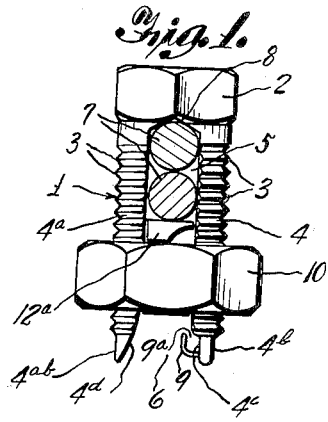
Figure 1 is a side elevation of a bifurcated form of connecter wherein the nut is operatively anchored to the keeper in accordance with my invention, two connected wires being shown in cross section.
Figure 2:
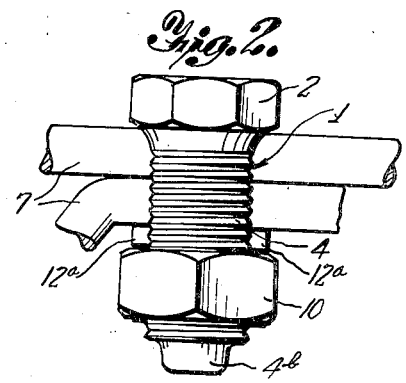
Figure 2 is a view of the assembly of Figure 1 at an angle of ninety degrees, fragments of the said wires being shown.

This invention contemplates an improvement upon the unitary form of connecter embodying a bifurcated or slotted bolt 1 having the faced head 2, the bolt proper being exteriorly threaded as shown at 3 and being longitudinally slotted to provide the spaced and segmentally screw-threaded sides or legs 4—4a and the intervening wireway or wire-slot 5 which opens out thru one end of the bolt or keeper as shown at 6, the member being thus adapted for receiving wires 7 which are to be connected. For this purpose the wires are forced up to the closed end or wire seat 8 by the nut 10, various means and methods having heretofore been employed for operatively anchoring the nut to the bolt to constitute a unitary connecter.

Figure 3:
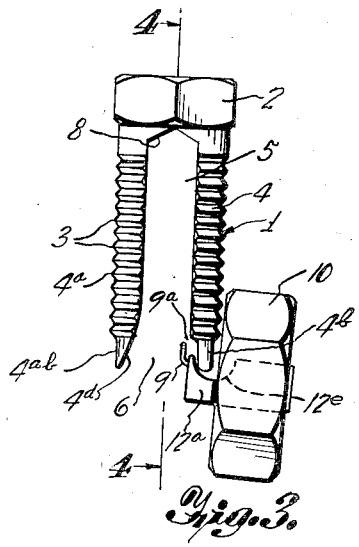
Figure 3 is a side elevation of the connecter alone, the nut being shown fully withdrawn and pendently turned aside at the extremity of one leg, as for receiving or removing wires.
Figure 4:
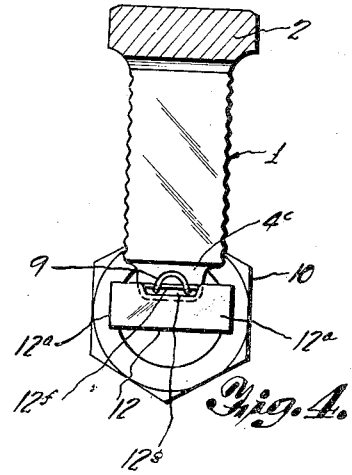
Figure 4 is a section on the line 4—4 of Figure 3.

In carrying out the present improvement the extremities of the legs 4—4a are preferably stripped of threads as represented at 4b—4ab as this conduces to ease and speed of operation. At its inner face the extremity 4b is cut away to provide a receiving notch or recess 4c and a hook 9 is rigidly extended from the inner face of this extremity as thus cut away, the hook projecting inwardly from the outermost point thereof and being turned or directed upwardly as shown in Figures 1 and 3 in such manner as to leave a suitable opening or clearance 9a between the nose of the hook and the adjacent inner face of the extremity 4b. The inner face of the extremity 4ab of the opposite leg is beveled off outwardly as shown at 4d for facilitating the insertion of wires into the slot 5 when the nut 10 is withdrawn and swung aside for that purpose, and as will be later more fully described.

Figure 5:
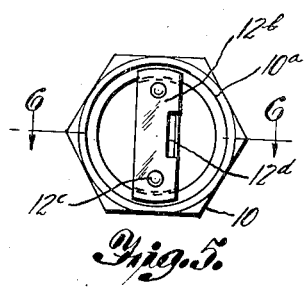
Figure 5 is a bottom plan view of the nut and lug assembly.
Figure 6:
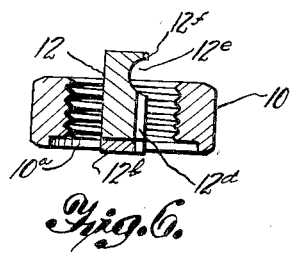
Figure 6 is a section on the line 6—6 of Figure 5.

The nut 10 is tapped to thread upon the legs of the bolt, and is formed with an annular race 10a at its predetermined outer face. A bearing lug 12 is rotatably mounted within the orifice of the nut by forming the lug to seat nicely yet freely therein, and by extending at its predetermined inner end the integrally connected ears 12a which overlap the predetermined inner face of the nut. A lock-plate 12b is then secured to the opposite or outer end of the lug, the ends of the plate riding freely within the race 10a of the nut, as clearly shown in Figure 5. This plate may be conveniently mounted in place by means of pins 12c passed thru the plate and into the lug. This lug is dimensioned to extend somewhat above the predetermined inner face of the nut, as shown in the various figures of the drawing, for the purpose of affording a clearance to the nut and permitting same to be swung fully aside at the end of the leg to which the assembly is attached, for the admission of wires into the medial slot of the bolt, or for removing such wires, as is well illustrated in Figure 3.

The lug 12 is formed at one side with a channel or groove 12d extending from end to end or parallel with the axis of the orifice of the nut when the lug is mounted therein, and with a transverse channel or groove 12e immediately back of the predetermined inner end of the groove 12d, both grooves being for purposes later to be pointed out. A strand or loop 12f is extended across the predetermined inner end of the groove 12d, the same lying approximately within the plane of the inner face of the lug, or just below that plane, and thereby forming in conjunction with the groove 12d which it spans, a hook engaging eye or aperture 12g. The lug 12 is generally formed and dimensioned to slidably pass within the slot 5 of the bolt or keeper 1 as the nut 10 is turned up toward the head thereof. The hook 9 of the bolt and the loop 12f and groove 12d of the lug are relatively so formed, located and arranged that on the withdrawal of the nut and lug assembly to the end of the bolt, the hook 9 passes along thru the groove 12d provided for the purpose and automatically engages the eye 12g and the loop 12f, whereby this assembly is prevented from being completely removed or disconnected from the bolt, altho it may be swung aside for admitting or removing wires. As clearly shown in Figure 3, as the nut and lug assembly is turned aside the nose of the extremity 4b enters the transverse groove 12e provided for that purpose, thereby preventing any binding of these elements, and allowing the nut and washer assembly to swing freely aside.

It is thought that from the foregoing description, the construction as well as the use and operation of the invention and of the connecter embodying same will be fully understood. When it is desired to insert wires within the slot 5 of the bolt or keeper, the nut and lug assembly is withdrawn off the end of the bolt and turned aside in the manner already explained, being held there suspended by the interlocked hook 9 and loop or eye 12f—12g. In order to join two or more wires they are then passed thru the entrance 6 into the slot 5 and the nut and lug assembly is turned up against them, forcing them into the seat 8 at the head of the bolt. As a matter of course the elements 9 and 12f might be reversed in location, if desired, the hook 9 being located on the lug or bearing element 12 and turned outwardly instead of inwardly and the loop or strand 12f being located on the inner face of the extremity 4b of the leg 4 of the bolt. This reversed arrangement is not shown in the drawing. The beveling off of the nose or extremity 4ab of the leg 4a of the bolt, as shown at 4d, is for the purpose of facilitating the insertion of the wires thru the entrance or mouth 6. It will be noted that in the construction shown the hook 9 lies permanently within the confines of the slot 5 and the extremities 4b—4ab of the legs of the bolt, being thus completely protected against damage and being out of the way so as not to interfere with the taping of the joint. This connecter is of course made of any suitable material for the purpose, such as brass.

While I have herein pointed out and described a certain embodiment of the invention, including certain structural features thereof, this embodiment and these features may of course be varied in minor details as may be expedient for producing a commercially practical connecter, not departing however from the spirit of the invention as defined in the appended claims.

I claim:

1. A unitary wire connecter, comprising in combination a bifurcate bolt having a medial wire receiving slot opening out thru one end, a hook within the slot of the bolt at the inner face of the extremity of one of the legs thereof, a nut threadable upon the legs of the bolt over the slot, a bearing lug rotatably anchored within the orifice of the nut and formed to slide within the slot of the bolt as the nut is turned thereon, and a loop on one face of the lug arranged to engage the hook of the bolt as the nut is unturned therefrom, whereby the nut and lug assembly may be withdrawn at the end of the bolt and swung aside for the admission or removal of wires.

2. In a wire connecter of the bifurcate bolt type, the bolt element having a medial wire receiving slot opening out thru one end thereof, thereby forming the legs of the bolt, and including a nut threadable upon the bolt legs over the slot, an inturned hook extended from the inner face of the extremity of one of the legs, a bearing lug rotatably anchored within the orifice of the nut and formed to travel within the slot of the bolt, and a loop on the predetermined inner end of the lug and extended laterally into the path of the said hook and arranged to engage that hook as the nut is unturned therefrom, the said hook and loop providing means for pendently supporting the nut and lug assembly when the nut is unturned from the bolt for admitting or removing wires thereinto or therefrom.

3. In a device of the kind described, a bifurcate bolt whereof the medial slot is a wire receiving slot forming the legs of the bolt, a nut threadable upon the legs of the bolt over the slot, and means for operatively anchoring the nut to the bolt in such manner that the nut may be withdrawn at the end of the bolt and swung aside for admitting wires, the same comprising an element rotatably anchored at the predetermined inner face of the nut as mounted on the bolt, a loop extended from this said element, and a hook extended from the inner face of the extremity of one of the legs of the bolt and arranged to engage the loop of the said element on the withdrawal movement of the nut from the bolt, the said element carrying the loop being formed to travel within the wire receiving slot of the bolt as the nut is turned on or off.

4. In a wire connecter embodying a conventional bifurcated bolt and nut assembly, the bifurcation of the bolt constituting a wire receiving slot, a hook supported on the bolt laterally within the mouth of the wire slot, an eye rotatably anchored on the nut and disposed laterally of the predetermined inner face thereof as mounted on the bolt and in longitudinal alignment with the hook of the bolt, and means for maintaining the eye in such alignment as the nut is rotated on the bolt, whereby the hook and eye will automatically interlock on the unturning of the nut off the end of the bolt.

5. In a wire connecter embodying a conventional bifurcated bolt and nut assembly, the bifurcation of the bolt constituting a wire receiving slot, a hook supported on the bolt laterally within the mouth of the wire slot, an element rotatably anchored to the nut and formed to slidably engage a margin of the wire slot for preventing the rotation of the element with the nut as the latter is turned on the bolt, and an eye arranged laterally on the predetermined inner side of the said element in longitudinal alignment with the hook of the bolt and so that the hook and eye will automatically interlock on the withdrawal of the nut and associated elements off the end of the bolt.

6. In a wire connecter embodying a threaded bolt longitudinally slotted out thru one end to provide a wire receiving slot and two spaced and segmentally threaded legs and a nut threadable on the bolt over the slot, an inturned hook on the bolt laterally within the mouth of the wire slot, a bearing element anchored on the nut and arranged to rotate on the axis thereof as the nut is turned on the bolt, this bearing element being formed to pass into the slot of the bolt and slidably contact the sides thereof in such manner as to prevent its rotation with the nut, and an eye carried laterally on the bearing element at the predetermined inner side thereof and in longitudinal alignment with the hook of the bolt, whereby the two will automatically interlock on the unturning of the bolt off the end of the nut, so that the nut and bearing element may be then swung aside for opening a way into the wire slot, the bearing element being grooved to pass the said hook in its travel inwardly and outwardly of the bolt and to accommodate the extremity of the leg of the bolt to which it is connected, as the nut is swung aside as aforesaid.

7. In a wire connecter embodying a threaded bolt longitudinally slotted out thru one end to provide a wire receiving slot and two spaced and segmentally threaded legs and including a nut threadable on the bolt over the slot, an inturned hook supported on the bolt entirely within the mouth of the wire slot and disposed laterally at one side of the slot, a bearing element rotatably anchored on the nut to rotate on the axis thereof as the nut is turned on the bolt, this element being formed to slidably pass into the slot of the bolt in such contact with the inner sides of the bolt legs as to prevent its rotation as the nut is turned, and an apertured element supported laterally on the bearing element at the predetermined inner side thereof in longitudinal alignment with the hook of the bolt, the hook and apertured element being thus adapted to interlock on the unturning of the nut off the end of the bolt, whereby the nut and element may be then swung aside for opening a way into the wire slot, the bearing element being recessed and slotted to accommodate the movements of the nut, bolt and hook in the operation of the device.

JASPER BLACKBURN.